1,719,462

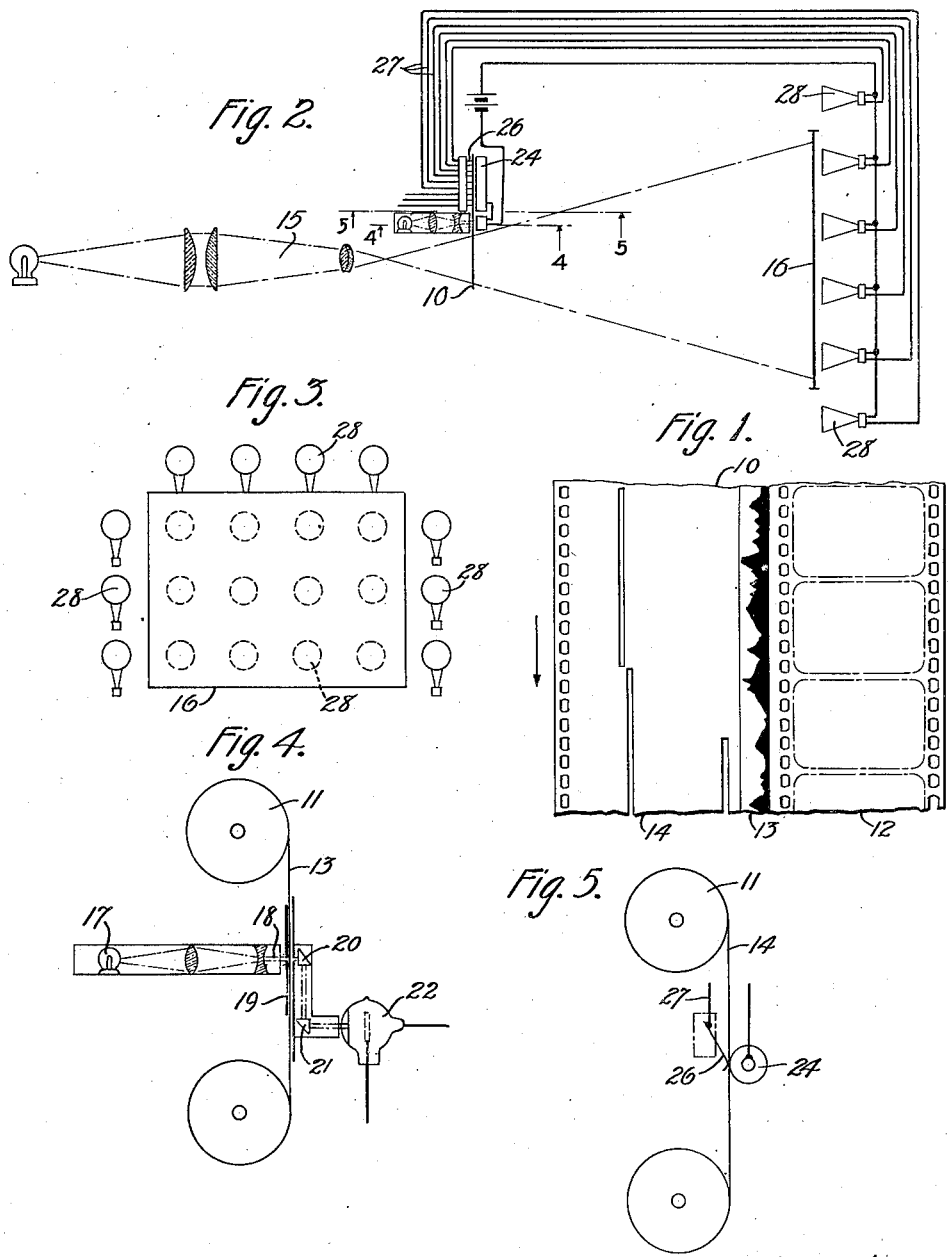

Patented July 2, 1929.

UNITED STATES PATENT OFFICE.

HENRY P. CLAUSEN, OF MAMARONECK, NEW YORK, ASSIGNOR TO WESTERN ELECTRIC COMPANY, INCORPORATED, OF NEW YORK, N. Y., A CORPORATION OF NEW YORK.

SOUND AND SCENE REPRODUCING APPARATUS.

Application filed June 7, 1923. Serial No. 643,852.

This invention relates to synchronized motion picture and sound producing apparatus and its object is to insure the production of the sound with the proper directional effect so as to give as complete an illusion of reality as possible.

In accordance with the general features of the invention means are provided to so produce the speech and other sounds which would normally occur during the action shown on a screen that the audience will hear the expected sounds coming from the correct direction at the proper time.

By the preferred method of practicing this invention, a picture record—the "film" of the silent picture—is produced, cut, and arranged in the usual manner. After it has been completed with the usual sub-titles and explanatory notes, it is projected upon a screen and the necessary accompanying sounds are produced and recorded during its projection. The speeches may thus be spoken either by the actors themselves or a trained corps of speakers, and the length of the conversation and the external noises may be properly regulated in accordance with the final arrangement of the picture. These noises may be recorded upon a series of phonograph record blanks, but preferably upon an electrically controlled light-sensitive film. Separate records of the conversation and noises from other sources may, of course, be made, if desired. A record of the direction from which the particular sounds being produced appear to come may be made at the same time. Such a record may consist of a perforated strip whose perforations are produced through the medium of a keyboard whose keys are arranged to correspond with the positioning of a series of loud speakers to be used behind or about the screen during a showing of the picture.

The drawings show the invention in its preferred form.

Fig. 1 shows a film on which is recorded the usual series of photographic impressions, a sound record, and a direction control record therefor.

Fig. 2 is a schematic view of the projecting apparatus.

Fig. 3 is a front view of the screen, showing a possible arrangement of the loud speakers.

Fig. 4 is a detail side view of the sound producing mechanism taken upon line 4—4 of Fig. 2.

Fig. 5 is a detail side view of a portion of the directional control mechanism taken upon line 5—5 of Fig. 2.

A complete projecting film 10, which may be wound between a pair of rollers 11, includes the usual picture record 12, a photographic sound record 13, which may be produced in any well known manner, such as that described in F. W. Adsit Patent No. 1,291,702 of January 21, 1919, and a direction regulating perforated strip 14 of non-conducting material. The usual picture projecting apparatus 15 is used to throw the picture upon a screen 16. The sound is reproduced from record 13 by means of a reproducing mechanism such as shown on Fig. 4. The rays from a source of light 17 are concentrated by a lens system into a parallel beam 18 which passes through a narrow slit 19 and the strip 13 where it is carried out of the path of the light thrown by the projecting apparatus 15 by a pair of prisms 20 and 21 onto the sensitive cathode of a photo-electric cell 22. By this cell, the light variations in the record 13 are transformed into variations in electric current which may then be amplified to a desirable degree by any suitable means. This current is conducted to a roller 24 of conducting material which bears against the underside of direction recording strip 14. A number of contact members 26 bear against the upper side of strip 14 so that they make contact with roller 24 through the perforations in the strip. One or more of leads 27 connect each of the contacts 26 to a loud speaking telephone 28 in the rear of and at different locations with respect to the screen, 16, which should be made of sound pervious material. Thus the perforations in strip 14 will determine the part of the screen from which the sound recorded on strip 13 emanates.

In this manner, not only may perfect synchronism between the sound and the picture be obtained, but the illusions of position and motion are prefectly sustained. For instance, when a train is supposed to be approaching the screen from the right, the audience will hear a whistle emanating from one of the loud speakers at the right of the screen; the click of the rails will be heard as the train appears to pass across the picture, the sound closely following the visual image on the screen; and finally a diminishing sound will issue from one of the loud speakers at the left as the train disappears. By making the sound record after the picture record has been arranged, sharp changes of sound at a "cut-in" can be avoided, and the whole arranged so as to combine the impression of reality with a smoothly operating dramatic effect.

It is evident, of course, that various modifications may be made in the specific design shown without departing from the spirit and scope of the invention.

The invention claimed is:

1. In a motion picture apparatus, a screen, a number of loud speakers in the back and at the side of the screen, a film picture record, a photographic sound record to accompany the picture, a perforated strip record of the direction from which the sound should emanate, said records formed in a single strip so that they may be unwound together from a roller to operate in exact synchronism, means whereby the picture is projected on the screen, means for reproducing and amplifying the recorded sound in one or more of the loud speakers, and means to control from which of the loud speakers a particular sound will emanate, said means comprising said perforated strip a conducting roller bearing upon one side thereof and a series of contacts connected electrically to the loud speakers bearing upon the other side.

2. In a motion picture apparatus, a screen, a number of loud speakers in the back and at the side of the screen, a film picture record, a sound record to accompany the picture, a perforated strip record of the direction from which the sound should emanate, said records formed in a single strip so that they may be unwound together from a roller to operate in exact synchronism, means whereby the picture is projected on the screen, means for reproducing and amplifying the recorded sound in one or more of the loud speakers, and means to control from which of the loud speakers a particular sound will emanate, said means comprising said perforated strip a conducting roller bearing upon one side thereof and a series of contacts connected electrically to the loud speakers bearing upon the other side.

In witness whereof, I hereunto subscribe my name this 1st day of June A. D., 1923.

HENRY P. CLAUSEN.